United States Patent [19]
Dörpmund

[11] Patent Number: 4,602,522
[45] Date of Patent: Jul. 29, 1986

[54] TRANSMISSION WITH OVERDRIVE

[75] Inventor: Heinz Dörpmund, Wolfsburg, Fed. Rep. of Germany

[73] Assignee: Volkswagenwerk Aktiengesellschaft, Wolfsburg, Fed. Rep. of Germany

[21] Appl. No.: 259,338

[22] Filed: May 1, 1981

Related U.S. Application Data

[63] Continuation of Ser. No. 945,896, Sep. 26, 1978, abandoned.

[30] Foreign Application Priority Data

Sep. 28, 1977 [DE] Fed. Rep. of Germany ....... 2743583

[51] Int. Cl.[4] ............................................. F16H 47/08
[52] U.S. Cl. ......................................... 74/688; 74/762
[58] Field of Search .................. 74/762, 763, 687, 688

[56] References Cited

U.S. PATENT DOCUMENTS

| 3,299,740 | 1/1967 | Stockton | 74/677 |
| 3,314,307 | 4/1967 | Egbert | 74/688 |
| 3,355,966 | 12/1967 | Boehm | 74/688 |
| 3,494,223 | 2/1970 | Mori | 74/688 |
| 3,620,100 | 11/1971 | Chana | 74/688 |

FOREIGN PATENT DOCUMENTS 1473919 2/1967 France .

Primary Examiner—Kenneth J. Dorner
Assistant Examiner—D. Wright
Attorney, Agent, or Firm—Brumbaugh, Graves, Donohue & Raymond

[57] ABSTRACT

A motor vehicle transmission includes a torque converter and planetary gear arrangement. Clutches are provided for connecting the torque converter with the gear arrangement. The clutches are arranged so that the direct drive transmission gear can be engaged either through the torque converter or partially bypassing the torque converter.

2 Claims, 1 Drawing Figure

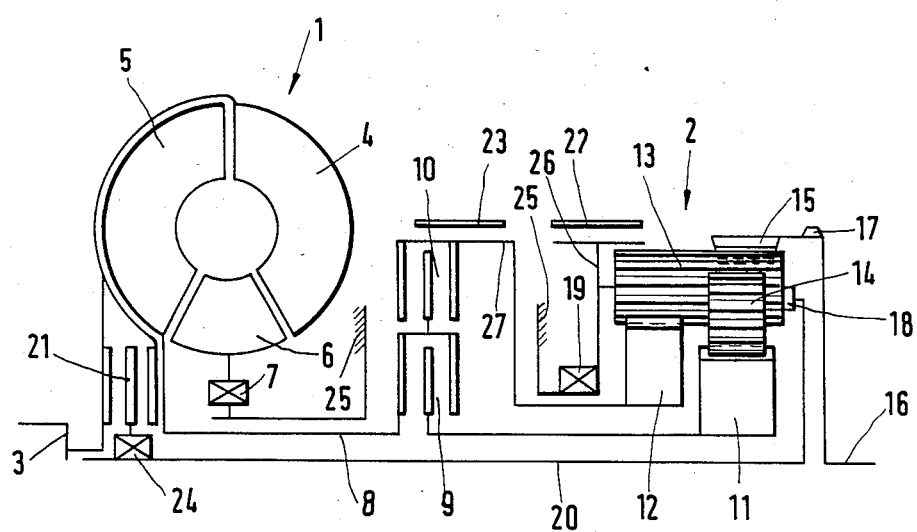

TRANSMISSION WITH OVERDRIVE

This is a continuation of application Ser. No. 945,896, filed Sept. 26, 1978 and now abandoned.

BACKGROUND OF THE INVENTION

This invention relates to hydrodynamic-mechanical transmissions for motor vehicles wherein there is provided a torque converter which is selectively connected to a planetary gear arrangement with hydraulically actuable clutch members to provide the various transmission speeds.

In particular, the invention relates to such transmissions wherein the planetary gear arrangement includes a first sun gear which is connectable to the torque converter output turbine rotor by a first clutch and a second sun gear connectable to the turbine rotor by a second clutch. A planetary gear carrier is connectable by a third clutch to the input pump rotor of the torque converter. Mounted on the planetary gear carrier is a first planetary gear connected to the second sun gear and a ring gear. A second planetary gear is mounted on the same planetary carrier and connected between the first sun gear and the first planetary gear.

A transmission of this general type is described in published German Patent Application No. 1,625,124. In the transmission described in that reference, the first forward speed is obtained by actuating the first clutch to engage the first sun gear to the torque converter output turbine rotor and holding the planetary carrier using a one way clutch or brake. Reverse speed is similarly obtained by locking the planetary carrier in position with a brake and engaging the second clutch to connect the second sun gear to the output rotor of the torque converter. Second gear is obtained by actuating the first clutch and locking a second brake which fixes the second sun gear in position. In order to obtain a direct drive for third gear, the first and third clutches are engaged which locks the planetary gear system into a single rotating set of gears. A fourth gear may be obtained by engaging the third clutch and the second brake, so that power is provided directly from the torque converter input to the planetary carrier which rotates around the locked second sun gear.

When the third clutch is engaged, there is provided a direct mechanical connection between the engine and the planetary gear system bypassing the torque converter, which usually operates with some slippage and consequent inefficiency. The planetary gear carrier is directly connected to the input pump rotor which is mounted on the engine drive shaft. Thus, in the fourth speed, or overdrive, the torque converter is completely bypassed. Against that, in third speed, there takes place a power branching because part of the power is transmitted to the planetary gear through the torque converter over the first clutch and the remaining power over the third clutch bypassing the torque converter.

While elimination of the torque converter from the transmission drive train eliminates losses on account of slippage and increases overall efficiency, the direct mechanical connection of the drive shaft to the engine causes a direct transmission of engine torque irregularities to the drive wheels of the vehicle. Especially at low engine and vehicle speeds, the engine torque irregularities can cause a perceptible impairment of riding comfort.

It is an object of the present invention to provide a hydrodynamic mechanical transmission of the known type, but having improved riding comfort, particularly at the lower speed range of third gear.

SUMMARY OF THE INVENTION

The invention is an improvement in a motor vehicle transmission having a torque converter and a planetary gear arrangement, the torque converter including a pump rotor connected to a transmission input shaft and a turbine rotor. The gear arrangement includes a first sun gear connectable to the turbine rotor by a first clutch, a second sun gear connectable to the turbine rotor by a second clutch and a planetary carrier connectable to the pump rotor by a third clutch, bypassing the torque converter. A first planetary gear is mounted on the carrier and engages the second sun gear. A second planetary gear is mounted on the carrier and engages the first sun gear and the first planetary gear. An ring gear is connected to an output shaft and engages the first planetary gear. In accordance with the invention, the gears and clutches are arranged to provide direct drive transmission of torque by simultaneous engagement of the first and second clutches, or the first and third clutches, or the first, second, and third clutches, the torque bypassing the torque converter when the third clutch is engaged.

In a preferred embodiment, there are provided control means responsive to vehicle or engine speed for engaging the first and second clutches at lower direct drive speeds and for engaging the third clutch, in addition to or in place of the second clutch, when a predetermined speed is exceeded. A one way clutch is advantageously provided between the third clutch and the planetary gear carrier.

In accordance with the invention, when the first and second clutches are engaged, in the direct drive speed, engine torque is transmitted to the output shaft by way of the torque converter and the planetary gear arrangement. As a result, the torque converter will cushion irregularities in the torque provided to the vehicle wheels. This operating arrangement is preferable for lower speeds in the direct drive gear. When the third clutch is engaged, in addition to or instead of the second clutch, power is transmitted partially past the torque converter by a straight mechanical connection of the input shaft to the planetary gear carrier. This arrangement is more efficient and preferable at higher engine speed where there is unlikely to be any irregularity in engine output torque. A transmission wherein the first and second clutches are engaged during the lower range of engine or vehicle speeds of the direct drive gear can provide improved passenger comfort. Higher efficiency can be obtained by engaging the third clutch when a predetermined speed, for example 50 or 60 km/hr, is exceeded. Thus, operation of the transmission using the torque converter for the lower speed range, and partially bypassing the torque converter in the higher speed range improves riding comfort in the lower speed range and increases fuel efficiency in the higher speed range.

The arrangement of the invention can also provide a one way clutch, which releases itself in the drag mode, arranged between the third clutch and the planetary carrier. This one way clutch provides additional fuel savings, since in fourth speed the connection between the engine shaft and the wheels is interrupted when the engine is not driving the wheels, so that the engine can run at an idle speed rather than at a higher rotational speed which results from a direct connection to the wheels. In order to provide the coasting mode in the overdrive speed, it is necessary to keep the second clutch engaged for all third speed operation so that disengagement of the one way clutch does not result in uncontrolled gear oscillations in the planetary gear system when the vehicle operates in the drag mode at the higher speed range of third gear.

For a better understanding of the present invention, together with other and further objects, reference is made to the following description, taken in conjunction with the accompanying drawing, and its scope will be pointed out in the appended claims.

BRIEF DESCRIPTION OF THE DRAWING

The drawing is a schematic representation showing a longitudinal section of a hydrodynamic-mechanical transmission in accordance with the invention.

DESCRIPTION OF THE INVENTION

The transmission shown in the drawing includes a hydraulic torque converter 1, and a planetary gear arrangement 2. The torque converter has an input pump rotor 4 which is directly connected to the engine shaft 3. The turbine output rotor 5 is connected to a hollow turbine shaft 8 which is connected to the planetary gear arrangement by clutches 9 and 10 as will be described. The torque converter also has a stator 6 which is connected to the housing 25 by a one way clutch 7.

The planetary gear arrangement 2 includes a first sun gear 11 which is connected to output turbine shaft 8 by a first clutch 9 and a second sun gear 12 which is connected to shaft 8 by clutch 10. A first planetary gear 13 is connected between the second sun gear 12 and ring gear 15. Ring gear 15 is connected to the output drive shaft 16 and is also provided with outer gear teeth 17 for engaging a parking lock, which is not shown.

A second planetary gear 14 is arranged in connection with the first sun gear and the first planetary gear 13. Planetary gears 13 and 14 are mounted on a planetary gear carrier 18. Carrier 18 is connected to the transmission housing 25 by a one way clutch 19 and connected by a central shaft 20 and clutch 21 directly to pump rotor 4 of torque converter 1, and consequently to engine shaft 3. Between the planetary carrier 18 and third clutch 21, there may be provided a one way clutch 24 which acts as a coaster, establishing a power transmitting connection only when the engine shaft is providing torque to the vehicle wheels, and disengaging when the vehicle wheels are supplying power to the engine shaft. First and second brakes 22 and 23, which are in the form of band brakes, are provided for acting on an arm 26 of carrier 18 and on a part 27 surrounding clutch 10, and connected to the second sun gear.

By actuation of the control members comprising clutches and brakes which are provided in the illustrated transmission, it is possible to obtain four forward speeds and one reverse speed. The settings of the control elements for each speed are as follows:

| | CONTROL ELEMENT | | | | | | |
|---|---|---|---|---|---|---|---|
| | 9 | 10 | 21 | 22 | 23 | 19 | 24 |
| Speed 1 | X | | | (X) | | X | |
| 2 | X | | | | X | | |
| 3a | X | X | | | | | |
| 3b | X | (X) | X | | | | X |
| 4 | | | X | | X | | X |
| R | | X | | X | | (X) | |

As noted in the Table, first gear is obtained by actuation of clutch 9 which connects sun gear 11 to the turbine rotor of torque converter 1. One way clutch 19 prevents rotation of planetary gear carrier 18. Alternately, brake 22 may be used to prevent rotation of gear carrier 18. With the planetary gear carrier 18 held by the one way clutch 18, torque is transmitted from sun gear 11 through planetary gears 14 and 13 to ring gear 15 and thence to drive shaft 16. Additional setting of brake 22 provides a bidirectional lock of planetary gear carrier 18 and therefore enables transmission of torque in both directions permitting engine braking.

To obtain second gear, brake 22 is released and brake 23, which is connected to sun gear 12 is connected. One way clutch 19 is also released permitting rotation of planetary gear carrier 18 around the fixed sun gear 12 in response to torque provided to sun gear 11.

Two control methods are available for providing a third or direct drive gear. Clutches 9 and 10 can both be engaged, with brakes 22 and 23 disengaged, so that both sun gears and consequently the entire planetary gear arrangement, including output ring gear 15, rotate at the same angular velocity as the drive shaft 8 which is connected to turbine rotor 5 of the torque converter 1. An alternate way of connecting the direct drive is to engage third clutch 21 to connected planetary carrier 18 directly to engine shaft 3, bypassing torque converter 1. First clutch 9 must also be engaged for this mode of operation, and second clutch 10 can be engaged or disengaged. When the first, second, and third clutches are all engaged, there exist two branches of the power train, a first branch through the torque converter by shaft 8 and clutches 9 and 10, and a second branch bypassing the torque converter and connected by central shaft 20 to the planetary carrier 18. If one way clutch 24 is provided for disengaging the connection of shaft 20 to clutch 21 when the vehicle is coasting in third gear, it is necessary to leave clutch 10 engaged when clutch 21 is engaged to prevent uncontrolled oscillations of the planetary gear system when the vehicle is coasting.

A fourth or overdrive speed is provided by releasing the first and second clutches 9 and 10, and engaging the third clutch 21 and the brake 23 which locks the second sun gear 12 in position. Torque transmission in this gear bypasses torque converter 1 by clutch 21 and one way clutch 24 and proceeds along the central shaft 20 to the planetary gear carrier 18. Since sun gear 12 is fixed in angular position, the rotational speed of shaft 20 is stepped up on ring gear 15, and output shaft 16 rotates at a higher speed than engine shaft 3. In the drag mode of fourth speed, one way clutch 24 disengages and permits the engine to run at idle speed while the vehicle coasts.

Reverse gear is obtained by engaging second clutch 10 and first brake 22, fixing the planetary gear carrier and causing reverse rotation of first planetary gear 13 and output ring gear 15.

In accordance with the invention, the third or direct drive speed of the transmission is obtained by engaging first and second clutches 9 and 10 for the lower speed range of third gear. At a predetermined intermediate speed, for example, 50 or 60 km/hr, third clutch 21 is additionally engaged. Operation in the low speed range therefore provides power transmission to the drive shaft by way of the torque converter, which tends to smooth out irregularities in the output torque of the engine. In the higher speed ranges of third gear, after engagement of clutch 21, the torque converter is partially bypassed resulting in a higher operating efficiency for the transmission. Second clutch 10 may be released when clutch 21 is engaged unless one way clutch 24 is provided between clutch 21 and planetary gear carrier 18, in which case clutch 10 should be kept engaged to prevent uncontrolled gear oscillations in the drag mode of third gear. Fourth speed is operated as an overdrive and completely bypasses torque converter 6 by clutch 21. One way clutch 24 enables free wheel coasting of the vehicle to increase efficiency in overdrive.

While there has been described what is believed to be the preferred embodiment of the invention, those skilled in the art will recognize that other and further modifications may be made thereto without departing from the spirit of the invention, and it is intended to claim all such embodiments as wall within the true scope of the invention.

I claim:

1. A method for operating a motor vehicle transmission having a torque converter, and a planetary gear arrangement, the torque converter including a pump rotor connected to a transmission input shaft and a turbine rotor, said gear arrangement including a first sun gear connectable to said turbine rotor by a first clutch, a second sun gear connectable to said turbine rotor by a second clutch, a planetary carrier connectable to said pump rotor by a third clutch, bypassing said torque converter, a first planetary gear mounted on said carrier and engaging said second sun gear, a second planetary gear mounted on said carrier and engaging said first sun gear and said first planetary gear, and a ring gear connected to an output shaft and engaging said first planetary gear, wherein said gears and clutches are arranged to provide a direct drive transmission gear ratio by engagement of the first and second clutches or the first and third clutches or the first, second and third clutches, said torque partially bypassing said torque converter when said third clutch is engaged, said method comprising setting a first clutch condition for said direct drive transmission gear ratio when said vehicle is operating at vehicle speeds below a selected vehicle speed, said first clutch condition having said first and second clutches engaged and said third clutch disengaged, and setting a second clutch condition for said direct drive transmission gear ratio when said vehicle is operating at vehicle speeds above a selected vehicle speed, said second clutch condition having said first, second and third clutches engaged, whereby said first and second clutch conditions provide the same transmission gear ratio with different torque transmission paths, said first clutch condition providing a first torque transmission path including said torque converter and said second clutch condition providing a torque transmission path at least partially bypassing said torque converter.

2. A method for operating a motor vehicle transmission having a torque converter, and a planetary gear arrangement, the torque converter including a pump rotor connected to a transmission input shaft and a turbine rotor, said gear arrangement including a first sun gear connectable to said turbine rotor by a first clutch, a second sun gear connectable to said turbine rotor by a second clutch, a planetary carrier connectable to said pump rotor by a third clutch, bypassing said torque converter, a first planetary gear mounted on said carrier and engaging said second sun gear, a second planetary gear mounted on said carrier and engaging said first sun gear and said first planetary gear, a ring gear connected to an output shaft and engaging said first planetary gear, wherein said gears and clutches are arranged to provide a direct drive transmission gear ratio by engagement of the first and second clutches or the first and third clutches or the first, second and third clutches, said torque partially bypassing said torque converter when said third clutch is engaged, said method comprising setting a first clutch condition for said direct drive transmission gear ratio when said vehicle is operating at vehicle speeds below a selected vehicle speed, said first clutch condition having said first and second clutches engaged and said third clutch disengaged, and setting a second clutch condition for said direct drive transmission gear ratio when said vehicle is operating at vehicle speeds above a selected vehicle speed, said second clutch condition having said first and third clutches engaged and said second clutch disengaged, whereby said first and second clutch conditions provide the same transmission gear ratio with different torque transmission paths, said first clutch condition providing a first torque transmission path including said torque converter and said second clutch condition providing a torque transmission path at least partially bypassing said torque converter.

* * * * *